United States Patent [19]

Berger et al.

[11] Patent Number: 4,765,017
[45] Date of Patent: Aug. 23, 1988

[54] WIPING DEVICE FOR WIPING COVER PLATES OF HEADLIGHTS OF MOTOR VEHICLES

[75] Inventors: Josef Berger, Wolfschlugen; Helmut Ernst, Bühl; Hans-Joachim Linhart, Ottersweier; Martin Pfeiffer, Stuttgart, all of Fed. Rep. of Germany

[73] Assignee: Robert Bosch GmbH, Stuttgart, Fed. Rep. of Germany

[21] Appl. No.: 877,433

[22] Filed: Jun. 23, 1986

[30] Foreign Application Priority Data

Jul. 4, 1985 [DE] Fed. Rep. of Germany ....... 3523927

[51] Int. Cl.⁴ .............................. B60S 1/04; B60S 1/32
[52] U.S. Cl. ................................ 15/250 A; 15/250.19; 15/250.34; 15/250.35
[58] Field of Search ............. 15/250 R, 250 A, 250 B, 15/250.15, 250.19, 250.20, 250.23, 250.33, 250.31, 250.34, 250.38, 250.35; 24/530, 536, 541; 403/DIG. 3, DIG. 9; D8/394; 248/74.1

[56] References Cited

U.S. PATENT DOCUMENTS

| | | | |
|---|---|---|---|
| 1,559,078 | 10/1925 | Everly | 403/DIG. 3 |
| 2,399,399 | 4/1946 | Smulski | 15/250.33 |
| 2,550,095 | 4/1951 | Smulski | 15/250.23 |
| 2,691,186 | 10/1954 | Oishei et al. | 15/250.31 |
| 2,716,795 | 9/1955 | Harker | 24/541 |
| 2,973,542 | 3/1961 | Horton | 15/250.35 |
| 3,135,004 | 6/1964 | Naigraw | 15/250 A |
| 3,837,036 | 9/1974 | Burger et al. | 15/250 A |
| 3,967,340 | 7/1976 | Cmolik | 15/250.2 |
| 4,279,396 | 7/1981 | Bendock | 24/530 |
| 4,507,711 | 3/1985 | Ono et al. | 15/250.31 |

FOREIGN PATENT DOCUMENTS

| | | | |
|---|---|---|---|
| 1480726 | 4/1970 | Fed. Rep. of Germany | 15/250.19 |
| 2351036 | 4/1975 | Fed. Rep. of Germany | 15/250 A |
| 578959 | 7/1958 | Italy | 15/250.34 |
| 712210 | 7/1954 | United Kingdom | 15/250.35 |

Primary Examiner—Harvey C. Hornsby
Assistant Examiner—Joseph S. Machuga
Attorney, Agent, or Firm—Michael J. Striker

[57] ABSTRACT

A wiping device for wiping cover plates of the headlights of motor vehicles includes a wiping arm carrying a wiper blade and swingable over the cover plate being wiped, and a drive shaft which is releasably connected to the wiping arm by means of an adapter. The wiping arm is comprised of two halves hinged to each other by a hinge the axis of which extends in a plane parallel to the cover plate being wiped. A spring is arranged between two hingeable halves of the wiping arm. The wiping device can be completely moved out from the path of light beams emitted by the headlight.

7 Claims, 1 Drawing Sheet

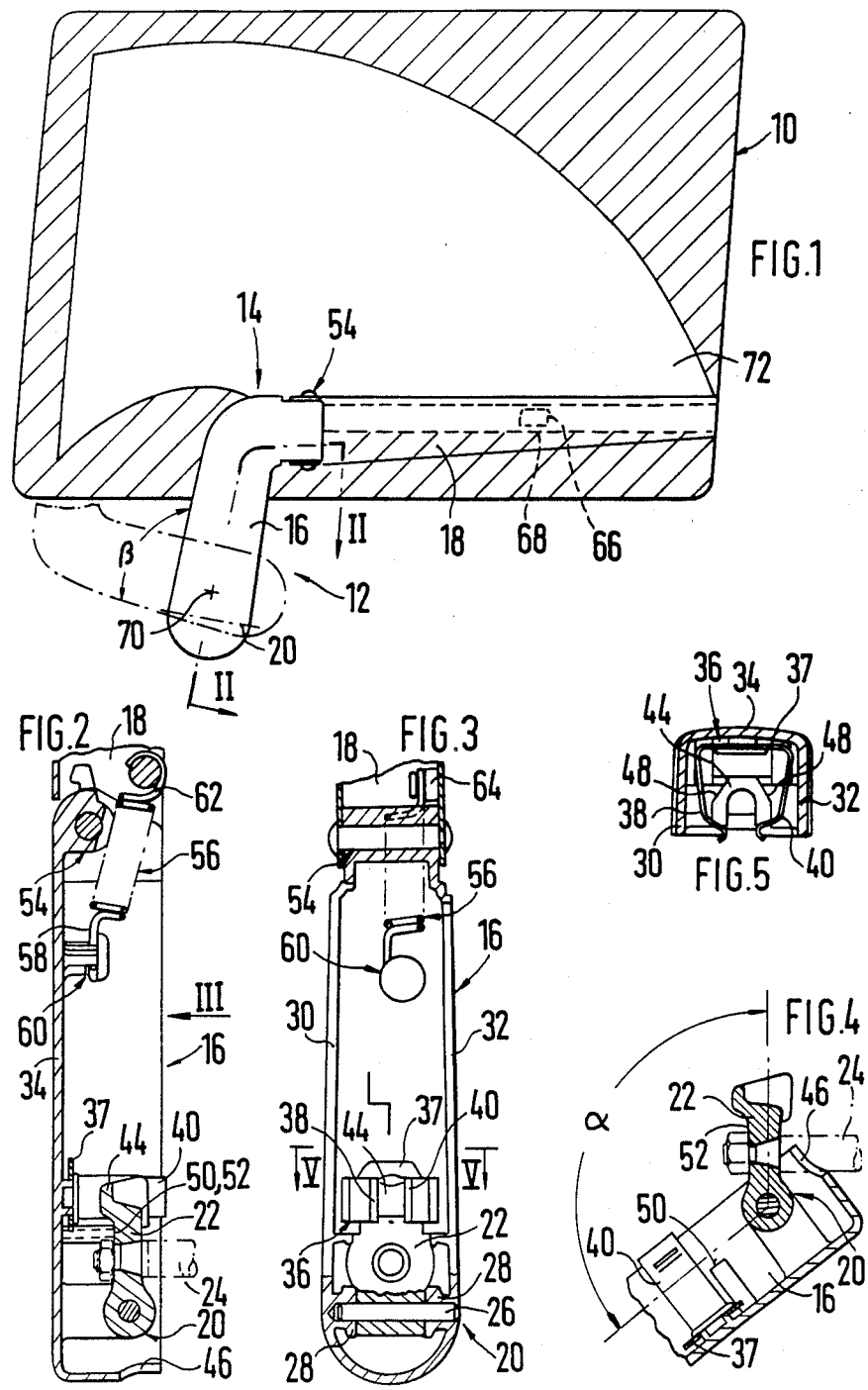

WIPING DEVICE FOR WIPING COVER PLATES OF HEADLIGHTS OF MOTOR VEHICLES

BACKGROUND OF THE INVENTION

The present invention relates to a wiping device for cleaning panes or cover plates of the headlights of motor vehicles.

A wiping device of the foregoing type has been disclosed, for example in DE-OS No. 23 42 306. In this conventional device, the compression spring for pressing the wiper blade against the cover plate to be wiped overlaps a single hinge for an adapter, arranged on the wiper arm carrying the wiper blade, and this spring loads the single-piece wiping arm relative to the cover plate. The swinging movement of the wiper arm away from the cover plate or pane is therefore certainly possible, but however the compression spring limits the angle of swinging and thus not all the components of the wiping device can be moved away from the path of the light rays emitted by the headlight.

SUMMARY OF THE INVENTION

It is an object of the present invention to provide an improved wiping device for the cover plates of the headlights of motor vehicles.

This and other objects of the present invention are attained by a wiping device for cleaning cover plates of the headlights of motor vehicles, comprising a wiping arm; an adapter hingedly connected to one end of said wiping arm by a first hinge; a drive member connected to said adapter so that said wiping arm is releasably-connected to said drive member via said adapter, said wiping are having another free end carrying a wiper blade which is applied to the cover plate of the headlight to be wiped by means of a prestressed spring element, said wiping arm including two arm portions hingedly connected to each other by a second hinge positioned between said first hinge and said wiper blade, said second hinge having an axle lying at least nearly in a plane parallel to the plane of said cover plate, one of said arm portions being hingedly connected to said adapter by said first hinge so that the wiping arm in an operation position is releasably-connected to said drive member while said spring element is engaged with said two arm portions.

The advantage of the wiping device according to the present invention resides in that the spring pressing the wiping arm with the blade towards the cover plate being wiped is arranged in the region of the second hinge provided between two portions of the wiping arm so that the first hinge, e.g. adapter hinge, is movable over a greater angle whereby all the structural components of the wiping device can be moved away from the path of light beams from the headlight.

The aforementioned spring element may be a helical tension spring.

One end of said spring may be rigidly connected to said one arm portion; and the device may further include a support element mounted to the other of said arm portions, the other end of said spring being connected to said support element, said support element being positioned closer to said cover plate than said second hinge and a connection of said one end of said spring to said one arm portion.

Said one arm portion may be provided with a locking element; a counter locking means may be provided, which is rigidly connected to said drive member, said locking element cooperating with said counter locking means in an operational position of said wiping arm.

The locking element may be a U-shaped spring having a base rigidly connected to said one arm portion and having two side portions which cooperate with said counter locking means under the swinging of the wiping arm.

The adapter may have a portion which forms said counter locking means.

Said one arm portion may have at least one stop, said adapter having a counter shoulder cooperating with said stop so that they abut against each other in an operational position of said wiping arm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a front view of the vehicle headlight, the cover plate of which is to be wiped by a wiper device according to the invention, also partly shown in FIG. 1;

FIG. 2 is a partial sectional view taken along line II—II of FIG. 1, of the wiping device on an enlarged scale;

FIG. 3 is a view, partially in section, of the wiper device as seen in the direction of arrow III in FIG. 2;

FIG. 4 is a partial view of the wiping device shown in FIG. 2, wherein the wiper arm is pivoted out from its operational position; and FIG. 5 is a sectional view taken along line V—V of FIG. 3.

DETAILED DESCRIPTION OF THE PREFERRED EMBODIMENT

Referring now to the drawings in detail, a cover plate 10 of a vehicle headlight is shown in FIG. 1. A wiping device 12 is arranged on the cover plate 10. The wiping device includes an angle-shaped wiping arm 14 which is comprised of two wiping arm halves or portions 16 and 18. Both wiping arm portions 16 and 18 have a substantially U-shaped cross-section. The arm portion 16 is provided at its one end with a hinge 20 by which an adapter 22 is connected with the arm portion 16. Adapter 22 is adjusted to the free end of a wiper shaft 24 in such a manner that the adapter and thereby also the wiping arm 4 can be connected to the wiper shaft.

The wiper shaft 24 is depicted in FIGS. 2 and 4 by dash-dotted line. As clearly seen in FIG. 3 the adapter hinge 20 has a hinge or pivot axle 26 which is supported in opposing bearing projections 28 provided on the inner sides of the hollow arm portion 16. Inside the hollow U-shaped arm portion 16, is positioned a U-shaped spring element 36 with its base portion 37. The spring element 36, namely its base portion 37, is secured to a cross-piece 34 which connects two opposing legs or walls 30 and 32 to each other. The spring element 36 includes two resilient pivotable U-shaped side pieces or portions 38 and 40 which belong to a releasably-lockable connection between the adapter 22 and the arm portion 16. Facing away from the adapter hinge 20, is an end portion 44 of the adapter. The free end portion 44 is formed so that, upon pivoting of the arm half or portion 16 from one position shown in FIG. 2 to the other mounting position shown in FIG. 4, the U-shaped side pieces 38 and 40 would slide, under the passing pivoting, over the end portion 44 of the adapter 22. Thereby the locking connection between the arm portion 16 and the wiper shaft 24, which acts as a drive member and is rigidly connected to the adapter 22, is released.

With reference to FIG. 4 it will be seen that a pivoting angle α amounts in the exemplified embodiment to approximately 125°. In order to realize such pivoting angle the arm portion 16 has an open recess 46 at the edge thereof so that the wiper shaft 24 is inserted into that recess, upon tilting. When the wiping arm 14 is pivoted back from the mounting position of FIG. 4 to the operational position according to FIG. 2 guide surfaces 48 of the adapter 22 will push the U-shaped portions 38 and 40 of the resilient locking element 36 away from each other so that the operational position of the wiping arm 14 relative to the adapter would be obtained and ensured as shown in FIG. 5.

As shown in FIG. 4 the wiping arm portion 16 has a stop means 50 to which a counter shoulder 52 of the adapter 22 corresponds. In the operation position of the wiping device 12 illustrated in FIG. 2, it is clearly seen that the stop 50 and shoulder 52 abut against each other and thereby the pivoting angle α of the wiping arm 14 is limited to the operational position of the arm. The shape of the U-shaped spring 36 which acts as a locking element and the shape of the end portion 44 of adapter 22, which acts as a counter locking means are adjusted to each other so that an acceptable position of the wiping arm 14 on the adapter 22 is ensured.

As seen in FIGS. 1 to 3 two arm halves or portions 16 and 18 are connected to each other by a hinge 54. This also means that the arm portion 16 can be held stationary relative to the drive member whereas the other arm portion 18 is movable relative to the arm portion 16. Corresponding ends of a spring element 56, formed as a tension spring, are engaged with two wiping arm portions 16 and 18, respectively. One end 58 of the helical tension spring 56 is connected at a connection 60 with arm portion 16 whereas the other end 62 of the tension spring 56 is held on a supporting element 64 of the other arm portion 18. The arrangement of the helical tension spring 56 is such that this spring in the operational position of the wiping arm, shown in FIG. 2, is prestressed.

In order to exert on the arm portion 18 a tractive force directed toward the cover plate 10 the supporting element 64 is positioned closer to the cover plate or pane 10 than the hinge 54 between the arm portions 16 and 18 and closer than the connection place 60 of spring end 58 to the arm portion 16. The tractive force or strain obtained in such a manner is applied to the cover palte 10 via a wiper blade 68 connected to the arm portion 18 via a support 66 (FIG. 1).

In operation of the wiping device the wiper shaft 24 oscillates about its axis 70 also seen in FIG. 1 over an angle β, whereby the wiper blade 68 covers a wiping field 72 on the cover plate or pane 10.

In the wiping device according to the present invention, the spring 56 for pressing the wiper blade 68 is also positioned at the additional hinge 54 by means of which two arm portions 16 and 18 are connected to each other. Hinge 20 for adapter 22 can swing, without limitation by the pressure spring 56 over the angle α of about 125° so that all the components of the wiping device lying in front of the pane 10 are positioned outside the light path of the headlight. In the operational position, the wiping arm 14 is releasably connected to the wiper shaft 24 via the locking means 36.

It will be understood that each of the elements described above, or two or more together, may also find a useful application in other types of wiping devices for cleaning cover plates of vehicle headlights differing from the types described above.

While the invention has been illustrated and described as embodied in a wiping device for wiping cover plates of motor vehicle headlights, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a wiping device for cleaning cover plates of the headlights of motor vehicles, comprising a wiping arm; an adapter hingedly connected to one end of said wiping arm by a first hinge; a drive member connected to said adapter so that said wiping arm is releasably-connected to said drive member via said adapter; a prestressed spring element, said wiping arm having another free end carrying a wiper blade which is applied to and pressed against the cover plate of the headlight to be wiped by said prestressed spring element, the improvement comprising said wiping arm including two portions hingedly connected to each other by a a second hinge positioned between said first hinge and said wiper blade, said spring element being interconnected between said two arm portions in the region of said second hinge, said second hinge having an axis lying at least nearly in a plane parallel to the plane of said cover plate, one of said arm portions being hingedly connected to said adapter by said first hinge (20) and being releasably connected to said drive member in an operational position of said wiping arm, said first hinge being positioned in said one of said arm portions so that it can swing by an angle greater than 90° so as pivot said wiping arm away from a path of light beams emitted from a headlight.

2. The device as defined in claim 1, wherein said spring element is a helical tension spring.

3. The device as defined in claim 2, wherein one end of said spring is rigidly connected to said one arm portion; and further including a support element mounted to the other of said arm portions, the other end of said spring being connected to said support element, said support element being offset towards said cover plate relative to said second hinge.

4. The device as defined in claim 3, wherein said one arm portion is provided with a locking element, and wherein a counter locking element is provided, which is rigidly connected to said adapter, said locking element cooperating with said counter locking element in the operational position of said wiping arm.

5. The device as defined in claim 4, wherein said locking element is a U-shaped spring having a base rigidly connected to said one arm portion and having two side portions which cooperate with said counter locking element under pivoting of the wiping arm.

6. The device as defined in claim 5, wherein said adapter has a portion which forms said counter locking element.

7. The device as defined in claim 1, wherein said one arm portion has at least one stop, said adapter having a counter shoulder cooperating with said stop so that they abut against each other in the operational position of said wiping arm.

* * * * *